Figure 4:
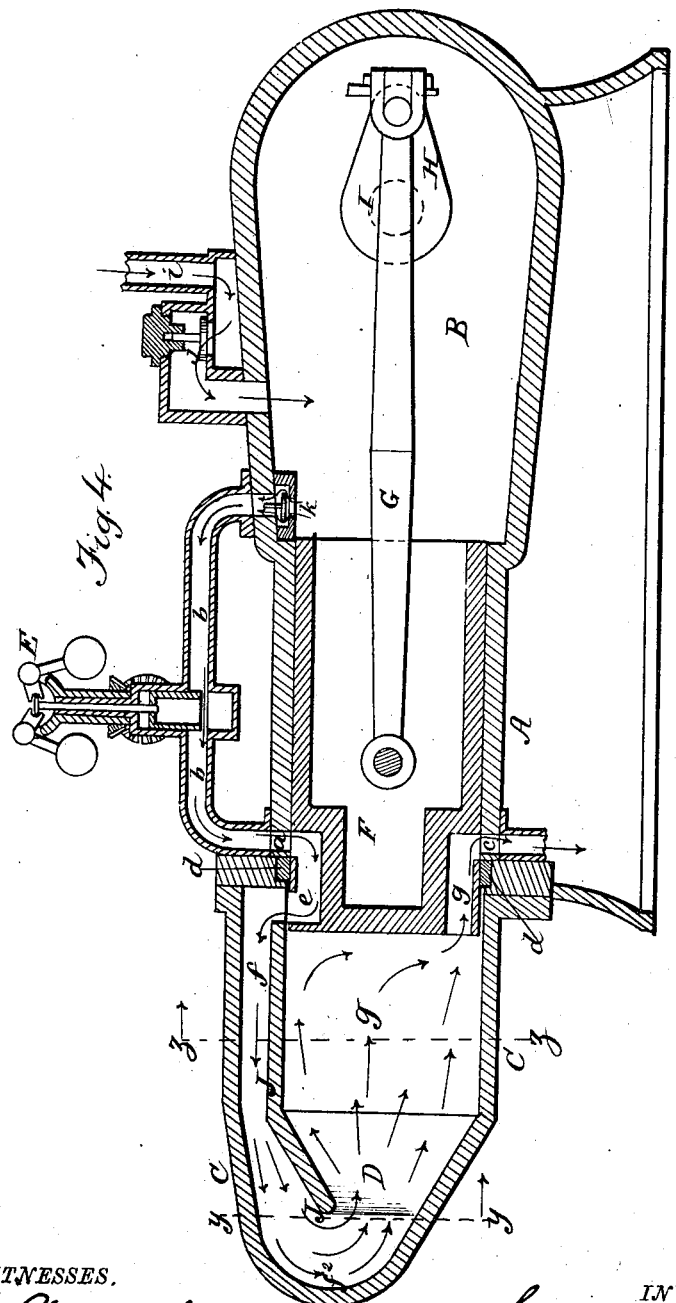

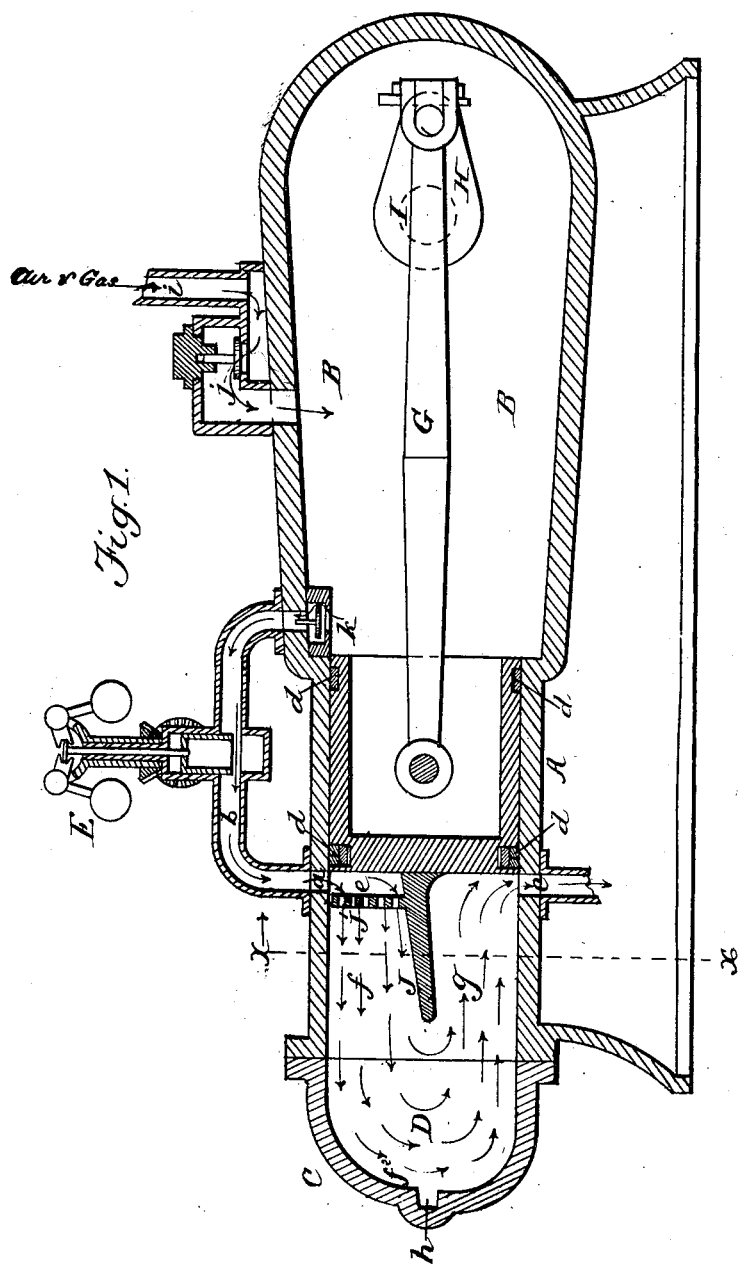

(No Model.) 4 Sheets—Sheet 2.
L. H. NASH.
GAS ENGINE.
No. 386,211. Patented July 17, 1888.
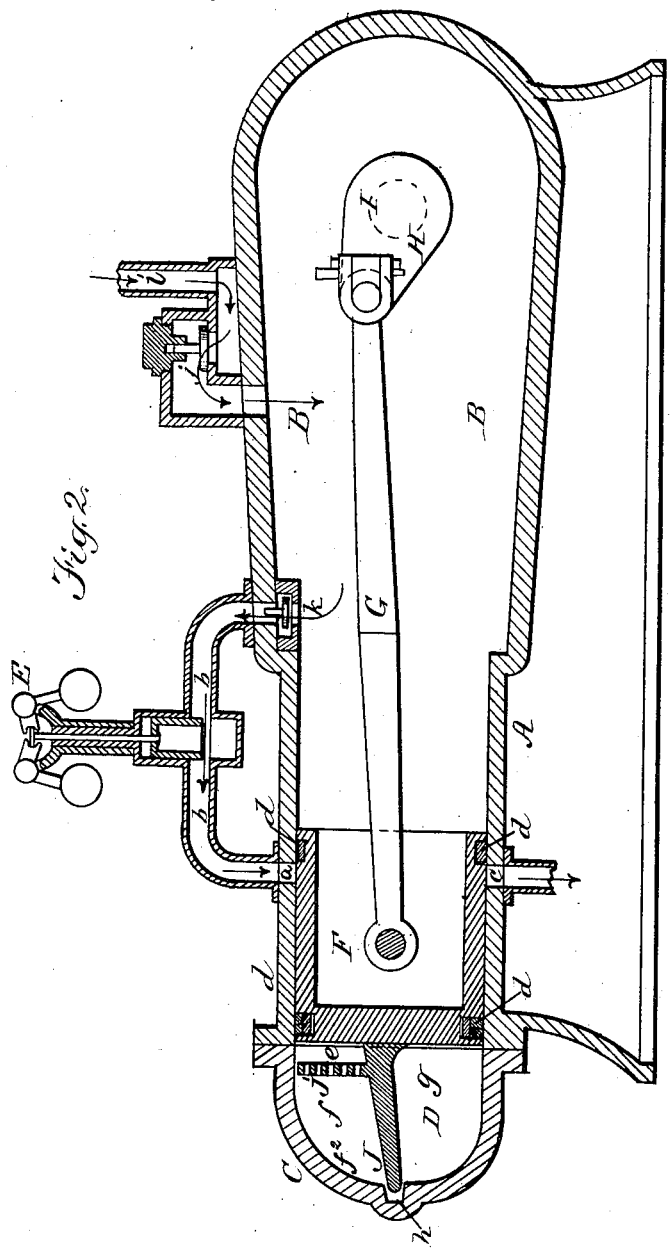
WITNESSES.
INVENTOR.
Lewis Hallock Nash,
by Johnson and Johnson,
Attorneys.

(No Model.) 4 Sheets—Sheet 3.
L. H. NASH.
GAS ENGINE.
No. 386,211. Patented July 17, 1888.
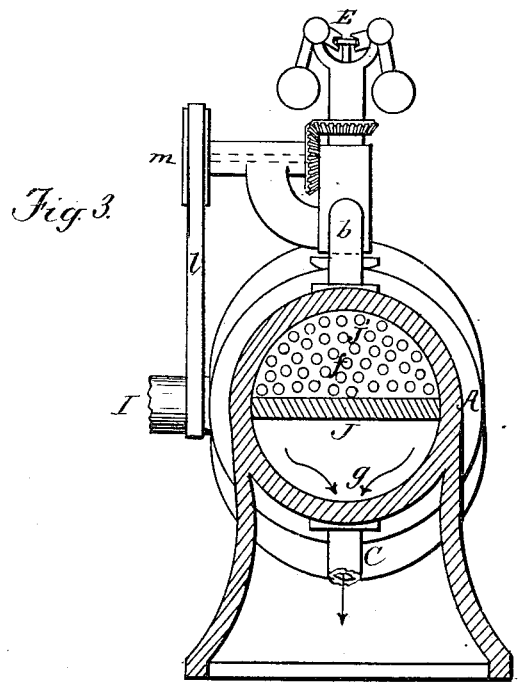
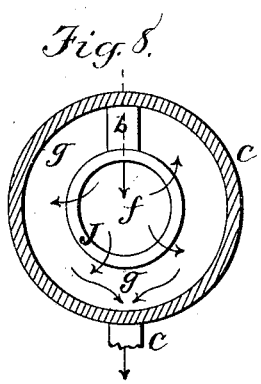
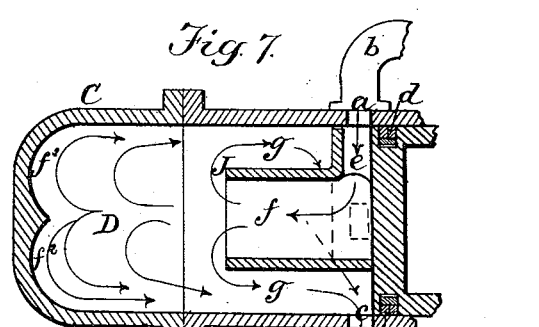
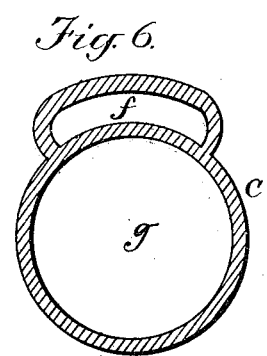
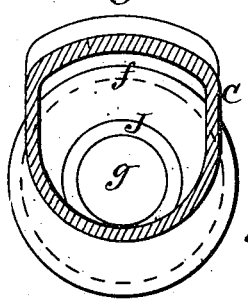
WITNESSES. INVENTOR.

(No Model.)

L. H. NASH.
GAS ENGINE.

No. 386,211. Patented July 17, 1888.

WITNESSES.
R. E. Grant.
W. E. Shaffer.

INVENTOR.
Lewis Hallock Nash.
by Johnson & Johnson.
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

GAS-ENGINE.

SPECIFICATION forming part of Letters Patent No. 386,211, dated July 17, 1888.

Application filed November 5, 1885. Renewed October 5, 1886. Again renewed June 21, 1887. Serial No. 242,015. (No model.)

*To all whom it may concern:*

Be it known that I, LEWIS HALLOCK NASH, a citizen of the United States, residing at Brooklyn, in the county of Kings and State of New York, have invented new and useful Improvements in Gas-Engines, of which the following is a specification.

My invention relates to gas-engines; and the objects of my improvements are to avoid the use of valves for the power-cylinder; to provide for admitting and exhausting the charge into and from the power-cylinder by the operation of the piston itself; to effect the displacement of the waste gases from the combustion-chamber by the incoming charge, which acts to drive out the waste gases in a direction opposite to that in which the charge enters; to utilize a closure of the piston-operating connections as a compression-chamber, for which the power-piston forms to compression-piston and supplies the charges for the engine therefrom; to regulate the speed and power of the engine, and to simplify the construction of the engine.

The means by which the waste gases are displaced from the cylinder by the incoming charge consists, primarily, of a construction by which the combustion-chamber is practically divided into separate passages, one communicating with the inlet and the other with the exhaust in such a manner that the inflowing charge will be directed in a course which reverses its flow, and thereby caused to return upon itself through the passage leading to the exhaust, and thereby expel the products of the old charge without mixing therewith. In carrying out this operation the means for effecting the division of the combustion-chamber may be carried by the piston, and is therefore movable or formed within the cylinder-walls as a fixture with identical effect and result, and my invention in this particular is, broadly, a means arranged within or forming a part of the combustion-chamber, whereby it is formed into separate spaces or passages for effecting a return-flow of the incoming charge upon itself, for the purpose stated.

Referring to the drawings, I have shown in Figure 1 a gas-engine in vertical longitudinal section, the piston being in the position of its extreme forward stroke, and the arrows illustrating the entrance of the charge and its return-flow in the cylinder to drive out the waste products of the preceding charge; Fig. 2, a similar view showing the piston at the beginning of its forward stroke; Fig. 3, a cross-section taken on the line $x\ x$ of Fig. 1; and Fig. 4 represents a modification of the means for dividing the combustion-chamber; Fig. 5, a cross-section thereof on the line $y\ y$, and Fig. 6 a cross-section thereof on the line $z\ z$; and Fig. 7 represents another modification of the means for dividing the combustion-chamber, and Fig. 8 a cross-section thereof.

The power-cylinder A opens into a closure, B, within which the piston-connections work. The outer end of the cylinder is closed by a hood or cylinder-extension, C, which forms the combustion-chamber D. One or more supply-ports, $a$, may be placed in the side of the cylinder in such position as to be uncovered by the piston on its extreme forward stroke and have communication through a pipe or passage, $b$, with the closure B, which, in fact, forms the compression-chamber for supplying the engine. In that side of the cylinder opposite to the supply-port $a$ may be made one or more exhaust-ports, $c$, connecting with the discharge-pipe, and, like the supply-ports, are so placed as to be uncovered by the piston on its extreme forward stroke. The piston has suitable packing-rings, $d$, and may be of the trunk form, and, like the cylinder, opens into closure, within which its connecting-rod G and crank H work.

I is the power-transmitting crank-shaft.

I know that it is not new to utilize the inflowing charge of a gas-engine to displace and drive out the waste products of combustion of the preceding charge; but I have devised a new way of doing this, so as to prevent the new charge from mixing with the waste products.

My plan embraces a division of the combustion-chamber, whether by fixed or movable means, so long as such means effect the inflow of the charge in a manner to reverse its direction course within the combustion-chamber, for the purpose stated. In Figs. 1, 2, 3, 7, and 8 such means are shown as being formed upon and moving with the piston, and in Figs. 4, 5, and 6 such division means are shown as being formed within the cylinder-walls. The moving division device may be a diameter projecting plate, J, as in Figs. 1, 2, and 3, or a tubular projection, as in Figs. 7 and 8. In either form it is placed upon the face of the piston and projects backward into the cylinder space, so as to divide it into two passages or spaces, f and g, as shown in Figs. 1, 2, and 3. To allow this dividing part to be as long as possible, a recess, h, may be formed in the interior wall of the cylinder-extension to allow the full movement of the piston.

With the diameter projecting plate J, I prefer to use a perforated plate, J', to form a continuation-space, e, of the supply-port a at the face of the piston when the latter is at the extreme of its forward stroke, as shown in Fig. 1, into which space the charge flows from the port a, and from which it is directed in separate parallel streams into the cylinder-space f, wherein they unite in a flowing volume. On the other side of this dividing part is the exhaust-port, and in order to direct and change the course of the inflow directly toward said exhaust-port I form the inner wall, f², of the cylinder cap or extension so curved in relation to the inlet-passage f and the exhaust-passage g as to cause and assist in the displacing action of the incoming charge without forming eddies, that would tend to mix the contents of the chamber. In this displacing action the incoming charge is reversed in its direction, the inflow moving in one space toward the cap, upon which it impinges, and is turned back in the opposite direction, driving out the waste gases before it on the opposite side of the dividing device. In Figs. 7 and 8 this identical result is obtained by means of a tubular projection from the face of the piston, as shown in Figs. 7 and 8, the inlet being through the tube and the return direction on its outer side. For small engines these plans will answer very well, and they have the advantage of economy and simplicity; but for large engines the heat of the burning gases is too great to admit of the use of these means for dividing the inflowing from the outflowing gases, and therefore I prefer in large engines to form the inlet-passage f in the cylinder-wall, as shown in Figs. 4, 5, and 6, so that the incoming charge will be conveyed direct to the end of the cylinder-chamber and be turned back over the end of the wall J into the combustion-chamber space g, driving out the products of the preceding charge. In either of these plans I may use a piston or a plunger with the packing on the piston or in the cylinder.

The passage or pipe b has a check-valve, k, which serves to allow the charge to pass into the engine from the pressure-reservoir B and to prevent the return of the charge into the said pressure-reservoir. A governor, E, serves to control and regulate the flow of the charge from the pressure-reservoir through the pipe b, and is operated from the crank-shaft through the belt l and pulley m. The pressure-reservoir is supplied with gas and air through the pipe i, which has a check-valve, j, in a manner which I shall presently state.

The operation of the engine is as follows: Gas and air are supplied in suitable proportions through the pipe i, and when the piston is on its back-stroke out of chamber B the gas and air are sucked in through the valve j into the chamber B. By the next forward stroke of the piston the gases in chamber B are compressed thereby to some extent, and as soon as the piston has opened the ports a and c, so as to allow the charge to enter through the port a and the exhaust gases to escape through port c, the pressure in chamber B opens valve k, and the charge flows through pipe b and port a into chamber D, and thence forces out the waste products from the cylinder-chamber, as shown by the arrows in the figures. The piston now begins its backward stroke, closing ports a and c and compressing the gases contained in the combustion-chamber, at the same time drawing in a new charge into chamber B through the valve j and pipe i. When the piston has reached the limit of its back-stroke, the charge contained in the combustion-chamber is highly compressed, and it is ignited by the electric spark just as the piston begins its next forward stroke, driving the piston ahead upon another stroke. Thus the charges are formed and partially compressed in the chamber B, then transferred through pipe b to the power-cylinder, wherein they are completely compressed by the back-stroke of the piston, and ignited upon the forward stroke to develop power in the engine. It will be seen that the compression-chamber B has a large amount of clearance-space, and that the whole of the charge is contained in this clearance-space under pressure prior to the opening of the inlet-port a by the piston.

As soon as the latter is opened, the compressed gases rush through the connecting-pipes, as shown by the arrows. If the governor were to close the passage of the gases through the pipe b entirely, no new charge would be admitted to the cylinder, and the compressed gases in chamber B would simply expand on the back-stroke of the piston, and no new charge would be drawn in through the valve j, because the chamber B would be completely filled. If, however, the passage b is partly open at that instant, (shown in Fig. 1,) as much of the charge will flow through the said pipe as can issue through the said opening during the time that the port a remains uncovered, which quantity will constitute the next explosive charge for the engine. The remaining portion of the compressed gases will remain in chamber B and will expand as the piston returns until the pressure therein is small enough to allow a fresh supply of gas to enter through the pipe i, which will be just enough to make up for what was admitted to the cylinder by the governor. The quantity of each charge is thus regulated by the governor by controlling the area of the supply-opening through the pipe b. Hence I utilize the clearance-space of the pressure-chamber to contain more or less of the gaseous mixture not required by the engine, and the regulation of the speed and power of the engine is thus effected by the combined action of the governor and a pressure-chamber having a large clearance-space, which acts as a storage space to hold the surplus gaseous mixture not required for the charge. In this method of governing the engine it is not necessary that the crank-connections should be contained in the pressure-chamber; but such arrangement enables me to utilize the forward action of a trunk or plunger piston to compress the charge, and thus avoid the necessity of a separate compression-chamber or stuffing-boxes to divide the pressure-chamber from the crank-connections, and thereby secures the construction of a very simple and cheap engine. I may, however, utilize an independent pressure-chamber having sufficient clearance-space with my method of admitting the charge.

It will be understood that, while I have shown the engine as operating to compress its charge by the forward stroke of the piston, it is not necessary to the operation of the piston in admitting and discharging the gases from the power-cylinder that the charge should be thus compressed, but that the operation of the said parts will be the same however the charge may be compressed and supplied. I prefer to effect the lighting of the charge by the electric spark; but it will be understood that other or mechanical means may be used for this purpose, if desired. I have also shown a simple form of governor; but it will be understood that other forms of governor may be used. In the operation of governing the engine as herein described, it is not material what the particular relation of the compression-pump is to the power-cylinder so long as the said pump has the necessary clearance-space.

The combination of the power-cylinder and piston of a gas-engine with a compression-pump, a reservoir into which each charge is compressed, having free communication with said compression-pump, and a governor controlling the quantity of the charge from said compression-pump, whereby the excess of the charge contained in the reservoir expands upon the back-stroke of the piston to properly limit the supply for said reservoir for supplying the engine, is not specifically claimed herein, but is made the subject of a subsequent separate application for a patent by me under Serial No. 215,419.

I claim—

1. The power-cylinder having the inlet and exhaust ports arranged to be operated by the piston, in combination with a combustion-chamber divided into separate passages and having a curved interior end wall, whereby the charge is directed into the chamber toward its curved wall and returned by the action of the latter, substantially as described.

2. The combination, in a gas-engine, of a power-cylinder having inlet and exhaust ports, and a piston adapted to uncover the said cylinder-ports at the end of its power stroke, with means, substantially such as described, whereby the waste gases are expelled by the incoming charge.

3. The combination, with the power-cylinder having its inlet and discharge ports formed in the walls thereof, of a piston adapted to operate said ports, having a face projection for dividing the combustion-chamber, substantially as described, for the purpose specified.

4. The combination, with the power-cylinder having its inlet and discharge ports formed in the walls thereof, of a piston adapted to operate said ports, having a face projection for dividing the combustion-chamber, and a perforated plate arranged to form an interior extension of the inlet-port, substantially as described, for the purpose specified.

5. The combination of the power-cylinder and a cap thereof forming the combustion-chamber, having its inner wall curved, with a piston having a central face projection co-operating with said curved wall to divide the combustion-chamber, substantially as described, for the purpose specified.

6. In combination, in a gas-engine, the power-cylinder having wall inlet and exhaust posts and a curved cap, the piston having a central face projection, the supply-passage b, a governor controlling the latter, the reservoir B, and the valves i j, constructed for operation substantially as described.

In testimony whereof I have hereunto set my hand in the presence of two subscribing witnesses.

LEWIS HALLOCK NASH.

Witnesses:
A. E. H. JOHNSON,
J. W. HAMILTON JOHNSON.